(12) United States Patent
McKay et al.

(10) Patent No.: US 8,518,215 B2
(45) Date of Patent: Aug. 27, 2013

(54) QUATERNARY VINYLAMINE-CONTAINING POLYMERS AS ADDITIVES IN PAPERMAKING

(75) Inventors: Jonathan M. McKay, Wilmington, DE (US); Qu-Ming Gu, Bear, DE (US); Richard J. Riehle, Wilmington, DE (US)

(73) Assignee: Hercules Incorporated, Wilmington, DE (US)

( * ) Notice: Subject to any disclaimer, the term of this patent is extended or adjusted under 35 U.S.C. 154(b) by 505 days.

(21) Appl. No.: 12/696,237

(22) Filed: Jan. 29, 2010

(65) Prior Publication Data

US 2010/0193148 A1  Aug. 5, 2010

Related U.S. Application Data

(60) Provisional application No. 61/206,442, filed on Jan. 30, 2009.

(51) Int. Cl.
*D21H 17/33* (2006.01)
*D21H 17/44* (2006.01)
*D21H 21/10* (2006.01)
*D21H 21/18* (2006.01)
*D21H 23/04* (2006.01)

(52) U.S. Cl.
USPC ............. 162/168.2; 162/158; 162/164.1; 162/164.6; 162/168.1; 162/185; 528/422

(58) Field of Classification Search
USPC ............ 162/158, 164.1, 164.6, 168.1–2, 162/18; 528/422; 526/310; 525/328, 2–4
See application file for complete search history.

(56) References Cited

U.S. PATENT DOCUMENTS

| | | | |
|---|---|---|---|
| 2,721,140 A | 10/1955 | Weisgerber | 92/3 |
| 4,421,602 A | 12/1983 | Gunter | 162/162 |
| 4,774,285 A | 9/1988 | Pfohl et al. | 525/60 |
| 5,269,942 A | 12/1993 | Harrington, IV et al. | 210/727 |
| 5,292,441 A | 3/1994 | Chen et al. | 210/735 |
| 5,430,110 A * | 7/1995 | Ahlers et al. | 525/328.2 |
| 5,630,907 A | 5/1997 | Nilz et al. | 162/168.2 |
| 5,961,782 A | 10/1999 | Luu et al. | 162/111 |
| 5,994,449 A | 11/1999 | Maslanka | 524/503 |
| 6,159,340 A | 12/2000 | Niessner et al. | 162/164.6 |
| 6,616,807 B1 | 9/2003 | Dyllick-Brezinger et al. | 162/175 |
| 6,797,785 B1 | 9/2004 | Hund et al. | 525/328.2 |
| 6,864,330 B2 | 3/2005 | Schneider et al. | 525/479 |
| 7,141,181 B2 * | 11/2006 | Mori et al. | 252/180 |
| 2005/0042193 A1* | 2/2005 | Mathauer et al. | 424/70.16 |
| 2008/0009596 A1 | 1/2008 | Gu et al. | 526/311 |
| 2009/0043051 A1 | 2/2009 | Gu et al. | 525/386 |

FOREIGN PATENT DOCUMENTS

| | | | |
|---|---|---|---|
| EP | 0 251 282 | | 6/1987 |
| JP | 10-110010 A | * | 4/1998 |

OTHER PUBLICATIONS

Machine translation of JP 10-110010, Advanced Industrial Property Network, Japan Patent Office, [online], [retrieved on Apr. 13, 2012]. Retrieved from the Internet: <URL: http://dossier1.ipdl.inpit.go.jp/AIPN/odse_top_dn.ipdl?N0000=7400 >.*

"Water Soluble High Polymer—Useful as Organic Sludge Dehydrating Agents and Paper-Making chemicals" WPI/THOMSON vol. 1998, No. 27, Apr. 28, 1998, XP 002511996 & JP 10 110010 A (Hymo Corp) Apr. 28, 1998 (the whole document).

* cited by examiner

*Primary Examiner* — Mark Halpern
*Assistant Examiner* — Dennis Cordray
(74) *Attorney, Agent, or Firm* — Joanne Rossi; Shaorong Chen; Michael J. Herman

(57) ABSTRACT

Vinylamine-containing polymers are disclosed where the amine groups are substituted with cationic functional groups. Processes for preparing such polymers, as well as compositions comprising such polymers are also disclosed. Among other applications, these polymers can be used in papermaking applications as dry strength additives, wet strength additives, retention aids, drainage aids, and pitch and stickies control agents.

15 Claims, No Drawings

QUATERNARY VINYLAMINE-CONTAINING POLYMERS AS ADDITIVES IN PAPERMAKING

This Application claims priority of U.S. Provisional Application No. 61/206,442, filed Jan. 30, 2009, the entire contents of which are herein incorporated by reference.

FIELD OF THE INVENTION

This invention relates to vinylamine-containing polymers and processes for preparing them, wherein the amine groups are substituted with cationic functional groups

BACKGROUND OF THE INVENTION

Both partially or fully hydrolyzed polyvinylformamide (i.e., polyvinylamine) can be used as dry strength additives, wet strength additives, retention aids and drainage aids in papermaking. Polyvinylamine has a linear backbone structure and one primary amine group for every two carbon units, making it highly cationic in an aqueous system due to the high density of primary amine functionality. These polymers possess strong hydrogen bonding ability as a result of this high density of primary amine groups. U.S. Pat. No. 2,721,140 discloses use of polyvinylamine as an additive to make papers having high wet strength, while U.S. Pat. No. 5,961,782 discloses use of polyvinylamine to make crosslinkable creping adhesive formulations. U.S. Pat. No. 4,421,602 discloses a partially hydrolyzed, water-soluble polymer of N-vinylformamide that contains N-vinylformamide units and vinylamine units. It also discloses use of polyvinylamine and a 50% hydrolyzed polyvinylformamide to increase flocculation efficiencies, fines retention, and the drainage rate of pulp fiber in papermaking processes, while U.S. Pat. No. 6,159,340 discloses the use of such polymers as dry and wet strength additives in paper and paperboard production, U.S. Pat. Nos. 6,616,807 and 6,797,785 disclose use of polyvinylamines as drainage aids, flocculants, and retention aids in the paper making.

Polyvinylamines are typically made by solution, free-radical polymerization of N-vinylformamide monomer, followed by base- or acid-catalyzed hydrolysis, whereby the primary amine in the polymer backbone is deprotected, releasing formic acid. U.S. Pat. No. 4,774,285 discloses that N-vinylformamide monomer may be copolymerized with an additional vinyl monomer, e.g., vinyl acetate, and subsequently hydrolyzed to produce a water-soluble copolymer of vinylamine and vinyl alcohol, which may be used as wet and dry strength additives for papermaking. U.S. Pat. No. 5,630,907 discloses copolymer compositions containing both vinylamine and acrylic acid units, as well as their applications. U.S. Pat. No. 6,797,785 discloses copolymers containing vinylamine units in combination with either diallyldimethylammonium (chloride) (DADMAC) or acrylamide units via reverse emulsion polymerization, and their use as flocculants and coagulants in papermaking. EP 0251182 discloses copolymers containing vinylamine and acrylonitrile units for use in papermaking as drainage aids, retention aids, as well as wet end additives for increasing the dry strength of paper products. In general, these copolymers contain vinylamine units and additional vinyl units linked together randomly through carbon-carbon bonds in a linear fashion, where the additional vinyl units reduce the density of vinylamine units in the polymer backbone, thereby giving it a lower cationic charge density as compared to polyvinylamine homopolymer.

The amine functionality of polyvinylamine can react with a variety of compounds having reactive functional groups. Post-polymerization chemical modification of polyvinylamine with functional groups is an alternative approach to produce polyvinylamine derivatives with altered physical and application properties. U.S. Pat. No. 5,994,449 discloses a resin composition that is the reaction product of epihalohydrin with a mixture of a poly(vinylamine-co-vinyl alcohol) copolymer and a polyaminoamide, as well as the use of these compositions as a creping adhesives. U.S. Pat. No. 5,269,942 discloses the use of quaternized polyvinylamines for deinking loop clarification, and U.S. Pat. No. 5,292,441 discloses their use as flocculants for wastewater clarification. The quaternized polyvinylamines in these two instances are obtained from the reaction of polyvinylamine with a quaternizing agent, such as methyl chloride, dimethyl sulfate, or benzyl chloride. U.S. Patent Application No. US 2008/0009596 A1 discloses polyvinylamine-containing polymers that are modified by $\alpha,\beta$-unsaturated alkyl carbonyl compounds, including amides, esters and acids. Particularly polyvinylamine-containing polymers modified with acrylamide showed particular effectiveness as additives in the papermaking process for improved dry strength paperboard products. U.S. Pat. No. 6,864,330 discloses a PEG grafted polyvinylamine derivative and also discloses that primary amines of the grafted polymer can be further cationized by reacting with an epoxide that contains the quaternary ammonium group. The grafted polymers are prepared by polymerizing vinylformamide in the presence of a PEG through free radical polymerization and are structurally different from polyvinylamine homopolymer and the copolymers. Vinylamine-containing polymers modified with butyl glycidyl ether are described in U.S. Pat. No. 5,324,787. Vinylamine-containing polymers modified with sodium chloroacetate are described in U.S. Pat. No. 6,133,392. U.S. Pat. No. 5,430,110 describes quaternized vinylamine-containing polymers, but does not describe their usefulness in enhancing the dry strength of a paper product or the enhancement of drainage of a papermaking system. Japanese Patent Application 10-110010A describes quaternized vinylamine-containing polymers, but does not articulate which specific compositions are most useful for dry strength of the paper product and drainage of the papermaking system. U.S. patent application Ser. No. 12/221,220 describes quaternized vinylamine-containing polymers. Compared to the present invention, U.S. patent application Ser. No. 12/221,220 presents a more specifically circumscribed portion of that invention wherein a polyvinylamine-containing polymer is preferably reacted with a quaternizing agent in a particular ratio that endows the resultant modified vinylamine-containing polymer with surprisingly high positive charge density, and exhibits unexpected enhanced dry strength, drainage, and fixative properties when used in papermaking applications.

BRIEF DESCRIPTION OF THE INVENTION

One embodiment of the present invention is a modified vinylamine-containing polymer comprising randomly distributed repeating monomer units having at least one of the formulae (I) or (II):

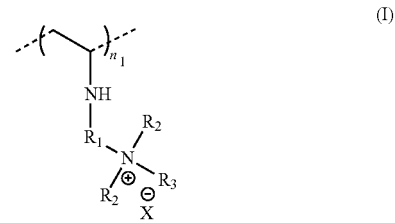

-continued

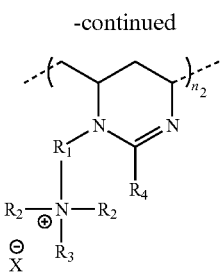
(II)

said polymer optionally further comprising randomly distributed repeating monomer units having at least one of the formulae (III), (IV), (V), (VI), (VII), or (VIII):

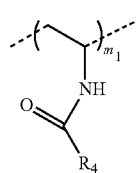
(III)

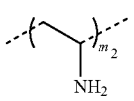
(IV)

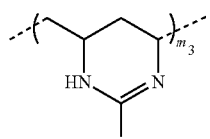
(V)

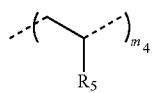
(VI)

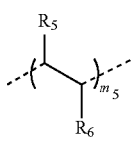
(VII)

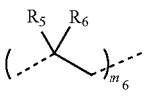
(VIII)

wherein $X^-$ is any anion, preferably $Cl^-$, $Br^-$, or $I^-$; $R_1$ is a straight chain or branched alkyl group containing up to 12 carbons, optionally substituted with hydroxyl, preferably $R_1$ is —$CH_2CH(OH)CH_2$— or —$CH_2CH_2$—; $R_2$ and $R_3$, identically or differently, are H or a straight chain or branched alkyl containing up to 22 carbons, preferably $CH_3$; $R_4$ is H or a straight chain or branched alkyl containing up to 22 carbons, preferably H or $CH_3$, more preferably H; $R_5$ and $R_6$ identically or differently are H, straight chain or branched alkyl containing up to 22 carbons, —COOH, —$COOR_2$, —$CH_2CO_2H$, —$CH_2CO_2R_2$, —$CH_2NR_2R_3$, —$NR_2R_3$, —$CONR_1R_4$, —OH, —$OCOR_2$, —$OR_2$, —$NO_2$, —CN, —$N^+(CH_3)_3$, alkenyl, alkynyl, or alkanoxyl; $n_1$, $n_2$, $m_1$, $m_2$, $m_3$, $m_4$, $m_5$, and $m_6$ are non-negative numbers from 0 to 100 indicating mole percent of randomly distributed repeating units of formulae (I), (II), (III), (IV), (V), (VI), (VII), and (VIII) present in said polymer, wherein $n_1$, $n_2$, $m_1$, $m_2$, $m_3$, $m_4$, and $m_5$ independently may be 0 mole percent; and the sum of $n_1$ and $n_2$ is larger than 0.1 mole percent. The dashed lines represent the bonds connecting the repeating units within the backbone of the polymer.

In one embodiment of the polymer the sum of $n_1$ and $n_2$ is greater than 0.1 mole percent and less than 10 mole percent.

Another embodiment a method of making paper comprising the step of adding an effective amount of the inventive polymer to the wet end of a paper machine, the polymer comprising randomly distributed repeating monomer units having at least one of the formulae (I) and (II).

Another embodiment of the invention is a process for preparing the modified vinylamine-containing polymers, comprising the step of reacting a vinylamine-containing polymer with a compound consisting of an alkylating agent containing a cationic functional group and an amine-reactive functional group.

The compositions described in this invention can be used to enhance the dry strength, wet strength, drainage, and fixative properties of paper when used as additives in the papermaking process.

DETAILED DESCRIPTION OF THE INVENTION

As used herein, the singular terms "a" and "the" are synonymous and used interchangeably with "one or more" or "at least one" unless the context clearly indicates a contrary meaning. Accordingly, for example, reference to "a compound" herein or in the appended claims can refer to a single compound or more than one compound. Additionally, all numerical values, unless otherwise specifically noted, are understood to be modified by the word "about."

One aspect of the present invention is directed to vinylamine-containing polymers wherein the amine groups are substituted with cationic moieties.

As used herein and unless otherwise stated, the terms "vinylamine-containing polymers," is understood to mean homopolymers of vinylamine (e.g., polyvinylamine or fully hydrolyzed polyvinylformamide), copolymers of vinylamine with other comonomers, partially hydrolyzed polyvinylformamide, partially hydrolyzed vinylformamide copolymers, vinylamine terpolymers, vinylamine homo- and copolymers manufactured by the Hofmann modification of acrylamide polymers.

The present invention is based upon modification of vinylamine containing polymers that are chemically modified after polymerization.

The polymers of the present invention comprise randomly distributed repeating monomer units having at least one of the formulae (I) and (II):

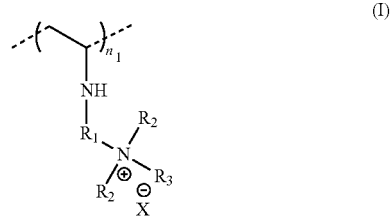
(I)

-continued

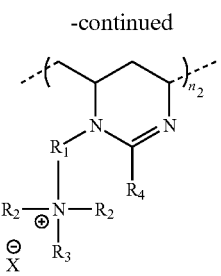
(II)

and optionally further comprise randomly distributed repeating monomer units having at least one of the formulae (III), (IV), (V), (VI), (VII), and (VIII):

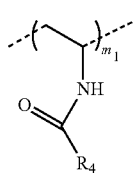
(III)

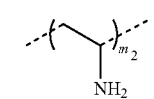
(IV)

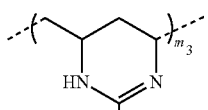
(V)

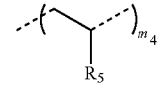
(VI)

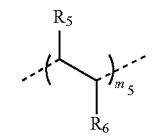
(VII)

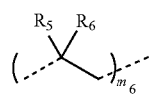
(VIII)

wherein $X^-$ is any anion, preferably $Cl^-$, $Br^-$, or $I^-$; $R_1$ is a straight chain or branched alkyl group containing up to 12 carbons, optionally substituted with hydroxyl, preferably $R_1$ is —$CH_2CH(OH)CH_2$— or —$CH_2CH_2$—; $R_2$ and $R_3$, identically or differently, are H or a straight chain or branched alkyl containing up to 22 carbons, preferably $CH_3$; $R_4$ is H or a straight chain or branched alkyl containing up to 22 carbons, preferably H or $CH_3$, more preferably H; $R_5$ and $R_6$ identically or differently are H, straight chain or branched alkyl containing up to 22 carbons, —COOH, —$COOR_2$, —$CH_2CO_2H$, —$CH_2CO_2R_2$, —$CH_2NR_2R_3$, —$NR_2R_3$, —$CONR_1R_4$, —OH, —$OCOR_2$, —$OR_2$, —$NO_2$, —CN, —$N^+(CH_3)_3$, alkenyl, alkynyl, or alkanoxyl; $n_1$, $n_2$, $m_1$, $m_2$, $m_3$, $m_4$, $m_5$, and $m_6$ are non-negative numbers from 0 to 100 indicating mole percent of randomly distributed repeating units of formulae (I), (II), (III), (IV), (V), (VI), (VII), and (VIII) present in said polymer, wherein $n_1$, $n_2$, $m_1$, $m_2$, $m_3$, $m_4$, $m_5$, and $m_6$ independently may be 0 mole percent; and the sum of $n_1$ and $n_2$ is larger than 0.1 mole percent. The dashed lines in the formulae represent the bonds connecting said repeating units within the backbone of said polymer.

The present invention does not encompass an ethoxylated polymer when $n_1$ or $n_2$ is more than 0.1 mole percent.

In one embodiment of the inventive polymer the sum of $n_1$ and $n_2$ is greater than 0.1 mole percent and less than 10 mole percent, preferably between 0.2 and 8 mole percent.

One embodiment of the present invention is the polymer that comprises randomly distributed repeating units of formula (I), wherein a vinylamine-containing polymer is cationized by an alkylating agent that has a quaternary amine group. In this embodiment, $X^-$ is any anion, preferably $Cl^-$, $R_1$ is a straight chain or branched alkyl group containing up to 12 carbons, optionally substituted with hydroxyl, preferably $R_1$ is —$CH_2CH(OH)CH_2$—; $R_2$ and $R_3$, identically or differently, are H or a straight chain or branched alkyl containing up to 22 carbons, preferably $CH_3$; $R_4$ is H or a straight chain or branched alkyl containing up to 22 carbons, preferably H or $CH_3$, more preferably H; $n_1$ is in the range of from 0.1, 1, 2, 3, or 5 to 8, 10, 20, 30, 40, 50, 60, 70, or 100 mole percent; the sum of $n_1$ and $n_2$ is in the range of from 0.1, 1, 2, 3, or 5 to 8, 10, 20, 30, 40, 50, 60, 70, or 100 mole percent; preferably in the range from 1 to 70 mole percent, more preferably in the range from 1.5 to 60 mole percent, more preferably in the range from 1.75 to 50 mole percent, more preferably in the range from 2 to 40 mole percent, more preferably in the range from 2.5 to 30 mole percent, and most preferably in the range from 3 to 20 mole percent.

One embodiment of the present invention is the polymer that comprises randomly distributed repeating units of formula (II), wherein a vinylamine-containing polymer is cationized by an alkylating agent that has a quaternary amine group. In this embodiment, $X^-$ is any anion, preferably $Cl^-$, $R_1$ is a straight chain or branched alkyl group containing up to 12 carbons, optionally substituted with hydroxyl, preferably $R_1$ is —$CH_2CH(OH)CH_2$—; $R_2$ and $R_3$, identically or differently, are H or a straight chain or branched alkyl containing up to 22 carbons, preferably $CH_3$; $R_4$ is H or a straight chain or branched alkyl containing up to 22 carbons, preferably H or $CH_3$, more preferably H; $n_2$ is in the range of from 0.1, 1, 2, 3, or 5 to 8, 10, 20, 30, 40, 50, 60, 70, or 100 mole percent; and the sum of $n_1$ and $n_2$ is in the range of from 0.1, 1, 2, 3, or 5 to 8, 10, 20, 30, 40, 50, 60, 70, or 100 mole percent; preferably in the range from 1 to 70 mole percent, more preferably in the range from 1.5 to 60 mole percent, more preferably in the range from 1.75 to 50 mole percent, more preferably in the range from 2 to 40 mole percent, more preferably in the range from 2.5 to 30 mole percent, and most preferably in the range from 3 to 20 mole percent.

Another embodiment of the present invention is the polymer, wherein the polymer has a molecular weight in the range of from about 4,000 to about 2,000,000 Daltons, more preferably in the range of from about 10,000 to about 1,000,000 Daltons, more preferably in the range of from about 20,000 to about 800,000 Daltons, most preferably in the range of from about 75,000 to about 600,000 Daltons. The polymer of the invention has a molecular weight of greater than 4000 Daltons, preferably greater than 10,000 Daltons, preferably greater than 20,000 Daltons, preferably greater than 75,000 Daltons. The polymer of the invention has a molecular weight of less than 2,000,000 Daltons preferably less than 1,000,000, of most preferable less than 800,000 Daltons.

Another embodiment of the present invention is the polymer, wherein the polymer has positive charge density at pH 7.0 of at least 5.0 meq/g, more preferably at least 6.0 meq/g, more preferably at least 6.5 meq/g, and most preferably at least 7.0 meq/g according to the specified Mütek titration method.

Another embodiment is a process for preparing the modified vinylamine-containing polymers, comprising the step of reacting a vinylamine-containing polymer with a compound selected from the group consisting of an alkylating agent containing a cationic functional group and an amine-reactive functional group.

Cationizing reagents or alkylating agents useful in the present invention include, but are not limited to, include 3-chloro-2-hydroxypropyltrimethylammonium chloride, (2-chloroethyl)trimethylammonium chloride, and 3-chloro-2-hydroxypropyl-alkyl-dimethylammonium chloride where the alkyl group is dodecyl (lauryl), octadecyl (stearyl), or cocoalkyl.

In one embodiment of the invention the cationizing reagent is 3-chloro-2-hydroxypropyltrimethylammonium chloride.

In addition to primary amine moieties, partially hydrolyzed polyvinylformamide and vinylamine copolymers typically comprise randomly distributed amidine functional groups having the general formula (V). The level of amidine functionality is dependent on hydrolysis conditions such as time, temperature, acid or caustic treatment and amount, and other factors. Persons of ordinary skill in the art will understand that the alkylation of primary amine functionality to give the randomly distributed repeating monomer units of formulae (I) can also occur on the nitrogen atoms of the amidine functional groups, resulting in randomly distributed monomer units of formulae (II) wherein $X^-$, $R_1$, $R_2$, $R_3$, and $R_4$, are as defined above. Without wishing to be bound by theory, if the alkylation step occurs on the nitrogen atom of a primary amine functionality of formula (IV) adjacent to a formamide functionality of formula (III), an equilibration step may subsequently occur, also resulting in randomly distributed monomer units of formula (II) with the designations of $X^-$, $R_1$, $R_2$, $R_3$, and $R_4$, as defined above.

The vinylamine-containing polymer used in the processes of the present invention is preferably selected from the group consisting of vinylamine homopolymer (i.e., polyvinylamine), vinylamine copolymers, vinylamine terpolymers, or vinylamine-containing polymers chemically modified after polymerization. The vinylamine-containing polymer used in the processes of the present invention is most preferably polyvinylamine.

Appending cationic functional group-containing substituents to the pendent amines of vinylamine-containing polymers increases the total weight of the resulting polymer, thereby increasing the molecular weight of the polymer, and also alters the cationic charge distribution of the resulting polymer. The alkylating agent containing a cationic functional group and an amine-reactive functional group used in the processes of the present invention is most preferably 3-chloro-2-hydroxypropyltrimethylammonium chloride. Without wishing to be bound by theory, the cationic charge density of the polymer would be expected to decrease as the amine-reactive modifier is appended. The cationic charge density of the polymer in this invention at pH 7.0 is at least 5.0 meq/g, more preferably at least 6.0 meq/g, more preferably at least 6.5 meq/g, and most preferably at least 7.0 meq/g.

Alkylation of vinylamine-containing polymers with an alkylating agent containing a cationic functional group and an amine-reactive functional group, such as 3-chloro-2-hydroxypropyltrimethylammonium chloride, is generally performed in water, but may also be performed in water/organic solvent mixtures. These alkylations may be conducted at a pH in the range of from 2, 4, 6, 8, 9, or 10 to 11.5, 12, 12.5, 13, or 14; preferably at a pH in the range of from 2 to 14, more preferably from 4 to 14, more preferably from 6 to 14, more preferably from 8 to 14, more preferably from 9 to 13, more preferably from 10.0 to 12.5, and most preferably from 11.5 to 12.0. These alkylations may be conducted at a temperature in the range of from 10, 20, 30, 40, or 50° C. to 60, 70, 80, 85, or 90° C.; preferably at a temperature in the range of from 10° C. to 90° C., more preferably from 20° C. to 85° C., more preferably from 30° C. to 80° C., more preferably from 40° C. to 70° C., and most preferably from 50° C. to 60° C. These alkylations may be conducted for a time period in the range of from 5, 10, 15, 20, 30, 40, or 60 minutes to 1, 2, 3, 4, 5, 10, 12, or 25 hours; preferably for a time period in the range of from 5 minutes to 25 hours, more preferably from 15 minutes to 12 hours, more preferably from 15 minutes to 10 hours, more preferably from 15 minutes to 5 hours, more preferably from 20 minutes to 4 hours, more preferably from 30 minutes to 3 hours, more preferably from 40 minutes to 2 hours, and is most preferably conducted in 1 hour to 90 minutes. These alkylations may be conducted with active vinylamine-containing polymer content in the reaction medium in the range of from 1, 3, 5, 8, or 10% to 20, 25, 30, 40, or 50 weight percent polymer solids in water; preferably conducted with polymer content in the reaction medium in the range of from 1 to 50 weight percent, more preferably from 3 to 40 weight percent, more preferably from 5 to 30 weight percent, more preferably from 8 to 25 weight percent, and most preferably from 10 to 20 weight percent active vinylamine-containing polymer solids in water. Without wishing to be bound by theory, a relatively wide range of reaction conditions are possible because the linkage between the 1-(N,N,N-trimethylammonium chloride)-2-hydroxypropyl and vinylamine moieties is relatively chemically stable under both alkaline and high temperature conditions.

Not wishing to be bound by theory, completely hydrolyzed vinylformamide theoretically consists only of vinylamine repeating units (i.e., vinylamine homopolymer), each vinylamine repeating unit possessing one primary amine and having a molecular weight of 43. Furthermore, all of the vinylamine repeating units in completely hydrolyzed vinylformamide can theoretically be alkylated by an alkylating agent containing a cationic group and an amine-reactive functional group. Thus, for example, if 20% of all the primary amines of polyvinylamine are alkylated by 3-chloro-2-hydroxypropyltrimethylammonium chloride, the molar ratio is 1:4, or 0.20.

When vinylamine-containing polymer is alkylated with an alkylating agent containing a cationic group and an amine-reactive functional group, the molar ratio of the alkylating agent to vinylamine units is preferably greater than 0.001, 0.01, 0.02, 0.03, 0.05 but less than 0.1, 0.2, 0.3, 0.4, 0.5, 0.6, 0.7, or 1.0; preferably greater than 0.01 but less than 0.7, more preferably greater than 0.015 but less than 0.6, more preferably greater than 0.0175 but less than 0.5, more preferably in the range from 0.02 to 0.4, more preferably in the range from 0.025 to 0.3, and most preferably greater than 0.03 but less than 0.2.

In one embodiment of the invention the alkylating agent containing a cationic group and an amine-reactive functional group is 3-chloro-2-hydroxypropyltrimethylammonium chloride.

Not wishing to be bound by theory, the molecular weight of the polymers of the present invention is important for its use as a papermaking additive for strength improvement of paper products. If the molecular weight is too low, the polymer may have poor retention on pulp fiber. If the molecular weight is too high, the polymer tends to over-flocculate the pulp fibers.

This may reduce the effectiveness of the polymer as a strength additive. In papermaking applications, the weight average molecular weight ($M_w$) of the vinylamine-containing polymers used to prepare the polymers of the present invention is in the range of from 4,000; 10,000; 20,000; 50,000; 75,000; 100,000; 150,000; or 200,000 to 400,000; 450,000; 500,000; 600,000; 700,000; 800,000; or 1,000,000; preferably from 4,000 to 1,000,000 Daltons, more preferably from 10,000 to 1,000,000 Daltons, more preferably in the range of from 20,000 to 800,000 Daltons, more preferably in the range of from 50,000 to 700,000 Daltons, more preferably in the range of from 75,000 to 600,000 Daltons, more preferably in the range of from 100,000 to 500,000 Daltons, more preferably in the range of from 150,000 to 450,000 Daltons, and most preferably in the range of from 200,000 to 400,000 Daltons. The $M_w$ of the polymers of the present invention is preferably in the range of from 100,000 to 1,000,000 Daltons, more preferably in the range of from 200,000 to 600,000 Daltons, and most preferably in the range of from 250,000 to 500,000.

In one embodiment of the invention the $M_w$ of the polymers of the present invention is in the range of from 200,000 to 600,000 Daltons, and more preferably in the range of from 250,000 to 500,000. and $R_1$ is —$CH_2CH(OH)CH_2$—, and $R_2$ and $R_3$ are identically —$CH_3$.

Not wishing to be bound by theory, it is believed that the charge density of vinylamine-containing polymers of this invention that have pendent and randomly distributed quaternary ammonium groups is less affected by pH in an aqueous media because of its quaternary amine functional groups. Additionally, it is believed that such polymers are more suitable as agents for stickies and pitch control. Moreover, for many applications, a high positive charge density has been found to be most effective. Not wishing to be bound by theory, it is believed that the modification of vinylamine-containing polymers with cationic moieties generally adds sufficient mass to the polymer that the overall positive charge density decreases; however, when said cationic moieties are appended in molar ratios of less than 20 mole percent, the product may exhibit an overall higher charge density, as measured by the specified Mütek titration method, than the unmodified vinylamine-containing polymer.

Vinylamine-containing polymers comprising randomly distributed repeating monomer units having the formula (I) exhibit reduced viscosity compared to the unmodified vinylamine-containing polymer at the same active polymer amount by weight percent. Not wishing to be bound by theory, the decreased viscosity may be attributable to reduced water binding ability of the polymer; alternatively, the introduction of additional electrolytes to the polymer has the potential to reduce the viscosity.

In one preferred embodiment, vinylamine-containing polymers comprising randomly distributed repeating units having the formulae (I) or (II) as well as (III), (IV), or (V) are preferably used as dry strength additives for paper products, to accelerate the drainage of the pulp fiber, and to increase the retention of fines and fillers by the pulp fibers during the papermaking process. Not wishing to be bound by theory, it is preferable that this polymer contain at least 1%, more preferably at least 5%, most preferably at least 10% on molar basis of unreacted pendant primary amine groups on the polymer backbone. Not wishing to be bound by theory, it is preferable that the polymer have a cationic charge density at pH 7.0 of at least 5.0 meq/g, more preferably at least 6.0 meq/g, more preferably at least 6.5 meq/g, and most preferably at least 7.0 meq/g.

Good performance in the dry strength tests is observed with less than 30 mole percent quaternization relative to the vinylamine theoretically in the unmodified polymer. Furthermore, if normalized for equal weight percent of polyvinylamine, polymers modified with less than 25 mole percent of an alkylating agent that has a quaternary amine group give equal or increased dry strength effectiveness compared to unmodified polyvinylamine.

Compositions of vinylamine-containing polymers comprising randomly distributed repeating units having the formulae (I), (II), or (I) and (II) also provide the desired application property for the paperboard product. These polymers are effective at a treatment level in the range of from 0.01, 0.02, 0.03, 0.05, 0.08, or 0.1 weight percent to 0.5, 0.6, 0.75, 1.0, 1.5, or 2.0 weight percent based on dry pulp; preferably from 0.01 to 2.0 weight percent, preferably from 0.02 to 1.5 weight percent, more preferably from 0.03 to 1.0 weight percent, more preferably from 0.05 to 0.75 weight percent, most preferably from 0.05 to 0.5 weight percent based on the dry pulp.

The polymers of the present invention can be used in a combination with other compositions in order to improve the properties of the polymer. The compositions that may be used in combination with the polymers of the present invention can be a cationic, or an anionic, or an amphoteric, or a nonionic synthetic, or a natural polymer. For example, the polymers of the present invention can be used together with a cationic starch or an amphoteric starch to improve the strength properties of paper products. The polymers of the present invention can also be used in combination with an anionic polymer, such as a polyacrylic acid, a copolymer of acrylamide and acrylic acid, or a carboxylmethyl cellulose in order to form a polyelectrolyte complex; a cationic polymer such as a copolymer of acrylamide and 2-(dimethylamino)ethyl methacrylate, a crosslinked polyamidoamine, a polydiallyldimethylammonium chloride, or a polyamine. The polymers of the present invention can also be used in combination with polymeric aldehyde-functional compounds, such as glyoxalated polyacrylamides, aldehyde celluloses and aldehyde functional polysaccharides. Individual compositions or any combination of different compositions may be applied together with the polymers of the present invention, or may be applied sequentially before or after the application of the polymers of the present invention. Individual compositions may be blended together with the polymers of the present invention to form a blended composition prior to use.

The embodiments of the invention are defined in the following Examples. It should be understood that these Examples are given by way of illustration only. Thus various modifications of the present invention in addition to those shown and described herein will be apparent to those skilled in the art from the foregoing description. Although the invention has been described with reference to particular means, materials and embodiments, it is to be understood that the invention is not limited to the particulars disclosed, and extends to all equivalents within the scope of the appended claims.

EXAMPLES

Polyvinylamine is abbreviated as PVAm. In the following examples, PVAm alkylated with an alkylating agent containing a cationic functional group may be described, for example, as PVAm quaternary ammonium (10). The number in the parentheses represents the mole % of 3-chloro-2-hydroxypropyltrimethylammonium chloride used in the reaction relative to vinylamine units. If the reaction efficiency is 100%, 10 mole % of the vinylamine units in the polyvinylamine are alkylated by 3-chloro-2-hydroxypropyltrimethylammonium chloride. The remaining unreacted vinylamine units in this polyvinylamine derivative would be 90 mole %.

Size exclusion chromatography (SEC) was used to measure molecular weight. The analysis was accomplished using gel permeation columns (CATSEC 4000+1000+300+100) and Waters 515 series chromatographic equipment with a mixture of 1% $NaNO_3$/0.1% Trifluoroacetic acid in 50:50 $H_2O:CH_3CN$ as the mobile phase. The flow rate was 1.0 mL/min. The detector was a Hewlett Packard 1047A differential refractometer. Column temperature was set at 40° C. and the detector temperature was at 35° C. The number average ($M_n$) and weight average molecular weight ($M_w$) of the polymers were calculated relative to the commercially available narrow molecular weight standard poly(2-vinyl pyridine).

The charge densities (Mütek) of the ionized polymers in the present invention were measured at pH 7.0 using a colloid titration method. Charge density (meq/g) is the amount of cationic charge per unit weight, in milliequivalents per gram of polymer active solids. The polymer sample is titrated with potassium polyvinyl sulfate (PVSK) to a 0 mV potential with an autotitrator (Brinkmann Titrino) at a fixed titration rate (0.1 mL/dose, 5 sec) and a Mütek particle charge detector (Model PCD 03, BTG, Mütek Analytic Inc., 2141 Kingston Ct., Marietta, Ga., USA) is used for end point detection.

Brookfield viscosity (BV) was measured using a DV-E or DV-II Viscometer (Brookfield Viscosity Lab, Middleboro, Mass.). A selected spindle (number 3) was attached to the instrument, which was set for a speed of 30 RPM. The reaction solution is prepared at a specific solid content. The Brookfield viscosity spindle was carefully inserted into the solution so as not to trap any air bubbles and then rotated at the above-mentioned speed for 3 minutes at 24° C. The units are in centipoises (cps).

Active polymer in the polymers of the present invention represents the total weight as a percentage in a solution of all the monomers and modifying compounds used for making such a polymer on dry basis. For example, a sample of PVAm Quaternary Ammonium (8) contains the active ingredients N-vinylformamide (the monomer precursor for polyvinylamine, molecular weight of 71.1) and 3-chloro-2-hydroxypropyltrimethylammonium chloride (65% aqueous solution, molecular weight of 188.1) in the amounts of 29.3 g and 9.5 g, respectively. If the described modified polymer solution has a weight of 298 g, the sample contains 11.9% active polymer.

Example 1

PVAm Quaternary Ammonium (8)

To a polyvinylamine solution (Hercobond® 6363 paper performance additive, available from Hercules Incorporated, 12% polymer active, 250 g) in a 1-L reaction flask was added aqueous sodium hydroxide to raise the pH to 10-12.0. The reaction mixture was heated to 50° C. and then 3-chloro-2-hydroxypropyltrimethylammonium chloride (Quat® 188, available from Dow Chemical Company, 65% active, 9.53 g) was added over 5 minutes while the pH was maintained in the range of from 10.0-12.0 with 50% aqueous sodium hydroxide. The resulting mixture was stirred at 50° C. for 3 hours and the pH was maintained in the range of from 9.5-11.5 using 50% aqueous sodium hydroxide. After cooling to ambient temperature, the pH was adjusted to 8.5 with aqueous hydrochloric acid to give the final product with total solids of 31.9% and total polymer active of 15.5%. The charge density measured 9.76 meq/g at pH 7.0. Brookfield viscosity was 443 cps. SEC: $M_w$: 319,000; $M_w/M_n$: 5.20. SEC of polyvinylamine (Hercobond® 6363): $M_w$: 306,000; $M_w/M_n$: 4.62.

Examples 1-1 through 1-9 in Table I were prepared as described in Example 1 using different molar ratios of 3-chloro-2-hydroxypropyltrimethyl-ammonium chloride (Quat 188, Dow Chemical Company, 65% active) to polyvinylamine (Hercobond® 6363 paper performance additive, available from, Hercules Incorporated, 12% polymer active).

TABLE I

Polyvinylamine Derivative with Pendent Quaternary Ammonium

| Examples | Quaternization (mol % of PVAm) | Polymer Active % | CD @ pH 7.0 (meq/g) | Viscosity (cps) | SEC $M_w$ (kDaltons) |
|---|---|---|---|---|---|
| Example 1-1 | 5 | 11.5 | 9.12 | 404 | 331 |
| Example 1-2 | 8 | 11.9 | 9.76 | 443 | 319 |
| Example 1-3 | 10 | 12.6 | 8.85 | 530 | 341 |
| Example 1-4 | 15 | 13.6 | 8.21 | 526 | 360 |
| Example 1-5 | 18 | 14.0 | 8.26 | 588 | 336 |
| Example 1-6 | 20 | 14.6 | 8.27 | 498 | 358 |
| Example 1-7 | 25 | 15.5 | 7.70 | 556 | 369 |
| Example 1-8 | 30 | 17.3 | 6.86 | 528 | 330 |
| Comparative Example 1-9 | 60 | 24.7 | 4.23 | 1072 | 335 |
| Example 1-10 | 35 | 17.6 | 6.04 | 578 | 342 |
| Comparative Example 1-11 | 50 | 19.9 | 4.93 | 1024 | 355 |
| Hercobond® 6363 | 0 | 11.7 | 8.47 | 1080 | 306 |

The charge density of quaternized PVAm was expected to continuously decrease with increasing degree of modification. The data in Table I show that at lower degrees of quaternization (<20 mole %), the measured positive charge density when compared to the standard unmodified polyvinylamine-containing polymer (Hercobond® 6363) appeared to unexpectedly increase. Without wishing to be bound by theory, modified PVAm polymers with measured higher charge density appear to give improved performance in the dry and wet strength tests (see Table III), and this higher charge density appears to occur especially when the polymer has been modified at less than 25 mole percent with respect to the PVAm polymer. Furthermore, the modified polymers have a significantly lower viscosity when modified at or less than 30 mole percent of the vinylamine units of the vinylamine-containing polymer backbone. This observation holds even as the percentage of active polymer in the product increases from 11.5 to 17.3 percent—the viscosity is still markedly lower than for the unmodified vinylamine-containing polymer Hercobond® 6363.

Example 2

PVAmidine Quaternary Ammonium (28)

To a partially hydrolyzed polyvinylamine solution (Hercobond® 6350 paper performance additive, available from Hercules Incorporated, 12% polymer active, 250 g) in a 1-L reaction flask was added aqueous sodium hydroxide to raise the pH to 10-12.0. The reaction mixture was heated to 50° C. and then 3-chloro-2-hydroxypropyltrimethylammonium chloride (Quat® 188, available from Dow Chemical Company, 65% active, 36.1 g) was added over 5 minutes while the pH was maintained in the range of from 10.0-12.0 with 50% aqueous sodium hydroxide. The resulting mixture was stirred at 50° C. for 3 hours and the pH was maintained in the range of from 9.5-11.5 using 50% aqueous sodium hydroxide. After cooling to ambient temperature, the pH was adjusted to 8.5 with aqueous hydrochloric acid to give the final product with total solids of 33.4% and total polymer active of 18.3%. The charge density measured 6.25 meq/g at pH 7.0. Brookfield viscosity was 556 cps. SEC: $M_w$: 369,000; $M_w/M_n$: 5.46.

Examples 2-1 and 2-2 in Table II were prepared as described in Example 2 using different molar ratios of 3-chloro-2-hydroxypropyltrimethyl-ammonium chloride (Quat 188, Dow Chemical Company, 65% active) to polyvinylamine (Hercobond® 6350 paper performance additive, available from Hercules Incorporated, 12.7% polymer active).

TABLE II

Polyvinylamidine Derivative with Pendent Quaternary Ammonium

| Examples | Quaternization (mol % of PVAmidine) | Polymer Active % | CD @ pH 7.0 (meq/g) | Viscosity (cps) | SEC $M_w$ (kDaltons) |
|---|---|---|---|---|---|
| Example 2-1 | 28 | 18.3 | 6.25 | 996 | 331 |
| Example 2-2 | 62 | 23.8 | 4.00 | 620 | 319 |
| Hercobond® 6350 | 0 | 12.7 | 8.84 | 928 | 323 |

Example 3

Evaluation as Dry Strength Additives in Papermaking Applications

The dry strengths of papers made with the polyvinylamine derivatives of the above examples are compared with the dry strengths of paper made with a benchmark dry strength resin polyvinylamine (Hercobond® 6363 paper performance additive, available from Hercules Incorporated).

Linerboard paper was made using a papermaking machine. The paper pulp was a 100% recycled medium with 50 ppm hardness, 25 ppm alkalinity, 2.5% GPC D15F and 2000 uS/cm conductivity. The system pH was 7.0 and the pulp freeness was about 380 CSF with the stock temperature at 52° C. The basis weight was 100 lbs per 3000 ft². Polyvinylamine derivatives prepared in the above examples were added as dry strength agents to the wet end of the papermaking machine at the level of 0.3 weight % of polymer active versus dry paper pulp. Unless otherwise indicated, OptiPlus 1030 amphoteric starch (National Starch, Bridgewater, N.J.) and PerForm® PC 8713 flocculant (Hercules Incorporated, Wilmington, Del.) were added to the wet end of the paper machine in the amount of 0.5% and 0.0125% of dry pulp, respectively. Ring crush, dry Mullen burst, dry tensile, and wet tensile tests were used to measure the dry strength effects.

The dry strength test results are shown below in Table III. Performances of the polyvinylamine derivatives are expressed as a percentage of the dry strength of paper made without a dry strength resin. Higher numbers indicate better performance for these strength data.

TABLE III

Strength Testing of Linerboard Made Using Quaternized Vinylamine-Containing Polymers

| Products | Mol % quaternization | Mullen Burst | Ring Crush | Dry Tensile | Wet Tensile |
|---|---|---|---|---|---|
| Hercobond® 6363 | 0 | 112.0 | 109.1 | 107.0 | 441.1 |
| Example 1-3 | 10 | 112.3 | 114.6 | 109.5 | 440.7 |
| Example 1-4 | 15 | 122.7 | 110.9 | 109.1 | 441.0 |

TABLE III-continued

Strength Testing of Linerboard Made Using Quaternized Vinylamine-Containing Polymers

| Products | Mol % quaternization | Mullen Burst | Ring Crush | Dry Tensile | Wet Tensile |
|---|---|---|---|---|---|
| Example 1-6 | 20 | 115.3 | 112.1 | 110.9 | 426.5 |
| Example 1-7 | 25 | 119.2 | 111.3 | 110.2 | 421.0 |
| Comparative Example 1-9 | 60 | 108.9 | 106.2 | 111.9 | 345.7 |
| Example 2-1 | 28 | 120.0 | 107.7 | 110.1 | 321.6 |
| Comparative Example 2-2 | 61 | 112.8 | 101.8 | 106.9 | 238.2 |

These data illustrate that the dry strength of the unmodified vinylamine-containing polymers Hercobond® 6363 and Hercobond® 6350 can be improved or maintained by quaternization. Furthermore, the addition of polymer modifier lowers the overall cost of the polymer and provides equal to increased dry strength effectiveness when compared to unmodified polyvinylamine on an equal weight basis of polyvinylamine.

The wet tensile data was expected to continuously decline with progressively higher degrees of quaternization on an equal polyvinylamine content basis. The data in Table III show that at lower degrees of quaternization (up to 15 mole percent), the measured wet tensile strength is approximately maintained when compared to the standard unmodified polyvinylamine-containing polymer (Hercobond® 6363) on an active polymer basis. A gradual decrease in wet tensile strength up to 25 mole percent modification followed thereafter. Without wishing to be bound by theory, wet tensile performance appears to be maximized when the polymers is modified with less than 20 mole percent of quaternization; when normalized for polyvinylamine content, polymers modified with less than 20 mole percent of quaternization may exhibit somewhat higher wet tensile performance. Also shown in Table III is the effect of varying degrees of quaternization of the vinylamine-containing resin on the dry strength of linerboard made with these products. Without wishing to be bound by theory, the best performance in the dry strength tests is observed resin has been modified less than 30 mole percent relative to the vinylamine theoretically in the unmodified polymer. Furthermore, based on equal weight of polyvinylamine, polymers modified with less than 25 mole percent of quaternization give equal or increased dry strength effectiveness compared to unmodified polyvinylamine. Higher numbers indicate better performance for these strength data.

TABLE IV

Strength Testing of Linerboard Made Using Quaternized Vinylamine-Containing Polymers

| Products | Mol % quaternization | Mullen Burst | Ring Crush | Dry Tensile | Wet Tensile |
|---|---|---|---|---|---|
| Hercobond® 6350 | 0 | 114.4 | 103.5 | 105.0 | 503.9 |
| Example 1-2 | 8 | 115.4 | 104.2 | 105.1 | 544.7 |

Table IV shows strength data of paper made with an 8 mole percent quaternized polyvinylamine-containing polymer and a partially hydrolyzed unmodified polyvinylamine Hercobond® 6350 paper performance additive (available from Hercules Incorporated). The strength properties of Hercobond® 6350 are generally considered to be similar to those of Hercobond® 6363. These data appear to confirm the trends inferred from the data in Table III using a different standard.

Example 4

Evaluation as Drainage and Retention Aids in Papermaking Applications

Drainage efficiency and retention/fixative properties of the polyvinylamine derivatives alkylated with cationic groups prepared in the above examples were compared using the Canadian Standard Freeness (CSF) Test Method with Hercobond® 6363 and 6350 dry strength resin and a blank. Another method for evaluation of the performance of the drainage process is the vacuum drainage test (VDT). The device setup is similar to the Buchner funnel test as described in various filtration reference books, for example see Perry's Chemical Engineers' Handbook, 7th edition, (McGraw-Hill, New York, 1999) pp. 18-78. The VDT consists of a 300-ml magnetic Gelman filter funnel, a 250-ml graduated cylinder, a quick disconnect, a water trap, and a vacuum pump with a vacuum gauge and regulator. The VDT test was conducted by first setting the vacuum to 10 inches Hg, and placing the funnel properly on the cylinder. Next, 250 g of 0.5 wt. % paper stock was charged into a beaker and then the required additives according to treatment program (e.g., starch, vinylamine-containing polymer, flocculants) were added to the stock under the agitation provided by an overhead mixer. The stock was then poured into the filter funnel and the vacuum pump was turned on while simultaneously starting a stopwatch. The drainage efficacy is reported as the time required to obtain 230 mL of filtrate. The results of the two drainage tests were normalized and expressed as a percentage of the drainage performance observed versus a system that did not include the vinylamine-containing polymer.

The turbidities of the filtrates were also measured to estimate fixative properties of the polymers. The dose of polymer active for all the additives was 0.3%. The results are summarized in Table V and the drainage performances of these compositions are expressed as percentage increase over the blank. The evaluations were performed using the CSF test. The fixative properties of the compositions are expressed as percentage of remaining turbidity based on that of the control in the absence of a resin. The lower the percentage, the more efficient the composition is as a fixative agent. Thus, higher numbers indicate better performance for the drainage/freeness data, and lower numbers indicate better performance for the turbidity data.

TABLE V

Drainage and Fixative Properties of
Polyvinylamine Derivatized with Pendent Cationic Group

| Products | mol % quaternization | % Freeness | % Turbidity |
|---|---|---|---|
| Hercobond ® 6363 | 0 | 158 | 45 |
| Example 1-1 | 5 | 165 | 33 |
| Example 1-3 | 10 | 173 | 23 |
| Example 1-4 | 15 | 176 | 30 |
| Example 1-6 | 20 | 181 | 35 |
| Example 1-7 | 25 | 172 | 36 |
| Comparative Example 1-9 | 60 | 146 | 40 |
| Example 2-1 | 28 | 146 | 38 |

In Table V, higher percentage freeness and lower percentage of turbidity relative to samples tested without drainage aid indicates better performance. This evaluation shows that all of the PVAm derivatives alkylated with cationic groups improved drainage performance of the pulp from 29% to 81% over the untreated sample under the conditions employed. Several samples (Example 1-1, 1-3, 1-4, 1-6, and 1-7) perform comparably or better than unmodified polyvinylamine Hercobond® 6363. It should be noted that even in the examples where performance is less than the Hercobond® 6363 benchmark, the examples have improved cost effectiveness relative to Hercobond® 6363 and have improved effectiveness on an equal polyvinylamine content basis. All of the samples except Example 2-2 exhibit better fixative properties than Hercobond® 6363. Under the conditions tested, Example 1-4 with 15 mole percent of vinylamine units theoretically quaternized shows the best fixative properties. Higher numbers indicate better performance.

TABLE VI

Drainage and Fixative Properties of
Polyvinylamine Derivatized with Pendent Cationic Group

| Products | mol % quaternization | % Freeness |
|---|---|---|
| Hercobond ® 6350 | 0 | 148 |
| Example 1-2 | 8 | 153 |

Table VI shows drainage data of pulp made with an 8 mole percent quaternized polyvinylamine-containing polymer and a partially hydrolyzed unmodified polyvinylamine Hercobond® 6350 paper performance additive (available from Hercules Incorporated). The drainage properties of Hercobond® 6350 are generally considered to be similar to those of Hercobond® 6363. These data appear to confirm the trends inferred from the data in Table V using a different standard. Quaternized polyvinylamine-containing polymers can possess superior drainage properties versus unmodified polyvinylamine polymers.

Example 5

Comparison of Strength and Drainage Properties of Quaternized Vinylamine-Containing Polymers Table VII shows the strength and drainage data of a pilot paper machine trial wherein a series of quaternized polymers were evaluated versus Hercobond® 6350 as a standard. The same polymers were evaluated as drainage aids using the VDT test as described above, comparing the drainage times of this test being compared to pulp drained without a vinylamine-containing polymer. In the pilot paper machine trial here, no wet end starch was used (i.e. no OptiPlus 1030 was used). Higher numbers indicate better performance for both drainage and strength data.

TABLE VII

Strength Testing of Linerboard Made Using Quaternized Vinylamine-Containing Polymers and Associated Drainage Testing

| Products | Mol % quaternization | Mullen Burst | Ring Crush | Dry Tensile | Wet Tensile | Vacuum Drainage |
|---|---|---|---|---|---|---|
| Hercobond ® 6350 | 0 | 111.3 | 108.2 | 106.4 | 562.8 | 148.9 |
| Example 1-2 | 8 | 116.4 | 111.8 | 109.2 | 598.1 | 160.1 |
| Example 1-3 | 10 | 116.8 | 112.4 | 111.0 | 601.4 | 156.7 |
| Example 1-4 | 15 | 119.2 | 109.8 | 107.7 | 580.8 | 150.5 |
| Example 1-5 | 18 | 114.0 | 110.9 | 108.3 | 569.8 | 145.3 |
| Example 1-6 | 20 | 116.3 | 111.1 | 107.9 | 566.9 | 136.7 |

TABLE VII-continued

Strength Testing of Linerboard Made Using Quaternized Vinylamine-
Containing Polymers and Associated Drainage Testing

| Products | Mol % quater-nization | Mullen Burst | Ring Crush | Dry Tensile | Wet Tensile | Vacuum Drainage |
|---|---|---|---|---|---|---|
| Example 1-7 | 25 | 116.9 | 108.8 | 106.4 | 536.1 | 146.1 |
| Example 1-8 | 30 | 116.7 | 108.9 | 108.9 | 534.2 | 133.7 |

Table VII shows that although polymers over a fairly broad range of quaternization give excellent strength properties when compared to Hercobond® 6350, their effectiveness as drainage aids decreases with increasing quaternization. Thus, the vinylamine-containing polymers with the greatest value as a combined strength and drainage aid are those with less than 25 mol % quaternization. Nonetheless, vinylamine-containing polymers with quaternization above this level still have value, since the low cost of the quaternization agent reduces the overall cost of the material. However, performance suffers as this agent is used in ever increasing amounts.

Table VIII shows the range of quaternized vinylamine-containing polymers again, this time compared to Hercobond® 6363 as a standard. Stalok 300 cationic starch (Tate & Lyle PLC, London, UK) was added in the place of OptiPlus 1030 amphoteric starch, still used at 0.5% of dry pulp. Higher numbers indicate better performance for both drainage and strength data.

| Products | Mol % quaternization | Mullen Burst | Dry Tensile | Wet Tensile | Vacuum Drainage |
|---|---|---|---|---|---|
| Hercobond ® 6363 | 0 | 107.9 | 103.8 | 365.0 | 158.7 |
| Example 1-1 | 5 | 111.7 | 106.7 | 374.5 | 158.4 |
| Example 1-2 | 8 | 111.5 | 105.4 | 377.8 | 156.0 |
| Example 1-3 | 10 | 109.7 | 108.7 | 372.2 | 154.8 |
| Example 1-4 | 15 | 110.9 | 109.4 | 372.2 | 149.6 |
| Example 1-7 | 25 | 117.1 | 107.3 | 350.0 | 137.8 |
| Example 1-10 | 35 | 110.7 | 107.5 | 335.5 | 131.6 |
| Comparative Example 1-11 | 50 | 108.4 | 106.1 | 300.1 | 126.2 |

Table VIII illustrates that the previous results again hold true, with quaternization giving the paper added dry strength over a fairly wide range, while the wet strength of the paper compared to paper made with unquaternized vinylamine-containing polymer (Hercobond® 6363) decreases with advancing levels of quaternization. The drainage results again reflect the value of quaternizing the vinylamine-containing polymer with less than 25 mol %, as the drainage properties of these polymers erode with advancing levels of quaternization. These results further illustrate the decreased value of quaternized vinylamine-containing polymers with levels of quaternization beyond what is herein claimed, shown by Comparative Example 1-11.

The invention claimed is:

1. A method of making paper providing improved strength and optionally retention and drainage and fixative properties, the method comprising the step of adding from 0.05 to 2.0 wt percent of a polymer based on the dry weight of pulp to the wet end of a paper machine, the polymer comprising randomly distributed repeating monomer units having at least one of the formulae (I) and (II):

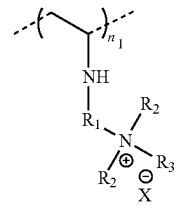

(I)

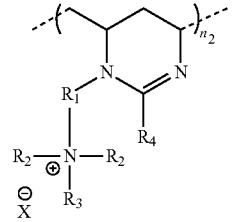

(II)

wherein $X^-$ is an anion;

$R_1$ is a straight chain or branched alkyl group containing up to 12 carbons, optionally substituted with hydroxyl;

$R_2$ and $R_3$, identically or differently are H or a straight chain or branched alkyl containing up to 22 carbons;

$R_4$ is H or a straight chain or branched alkyl containing up to 22 carbons;

$n_1$, and $n_2$ independently may be 0 mole percent;

wherein the sum of $n_1$ and $n_2$ is greater than 0.1 mole percent and less than 20 mole percent; and wherein said polymer has a molecular weight in the range of from about 20,000 to about 800,000 Daltons.

2. The method of claim 1 wherein the polymer further comprising randomly distributed repeating monomer units having at least one of the formulae (III), (IV), (V), (VI), (VII), and (VIII):

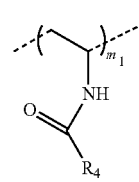

(III)

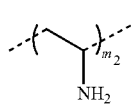

(IV)

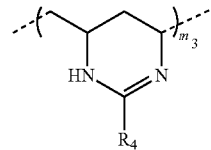

(V)

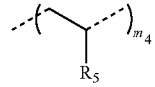

(VI)

-continued

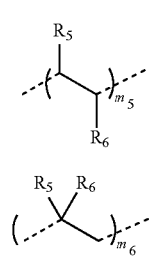

(VII)

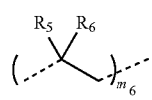

(VIII)

wherein $R_5$ and $R_6$ identically or differently are H, straight chain or branched alkyl containing up to 22 carbons, —COOH, —COOR$_2$, —CH$_2$CO$_2$H, —CH$_2$CO$_2$R$_2$, —CH$_2$NR$_2$R$_3$, —NR$_2$R$_3$, —CONR$_1$R$_4$, —OH, —OCOR$_2$, —OR$_2$, —NO$_2$, N$^+$(CH$_3$)$_3$, alkenyl, alkynyl, or alkanoxyl; and $m_1$, $m_2$, $m_3$, $m_4$, $m_6$, and $m_6$ represent the mole fraction of formula III, IV, V, VI, VII and VIII respectively in the polymer.

3. The method of claim 1, wherein $R_1$ is —CH$_2$CH(OH)CH$_2$—.

4. The method of claim 3, wherein $R_2$ and $R_3$ are —CH$_3$ and the sum of $n_1$ and $n_2$ is in the range of from 2 to 20 mole percent.

5. The method of claim 1, wherein $R_1$ is —CH$_2$CH$_2$—.

6. The method of claim 1, wherein $R_1$ is —CH$_2$CH$_2$CH$_2$— and the sum of $n_1$ and $n_2$ is in the range of from 2 to 20 mole percent.

7. The method of claim 1, wherein the sum of $n_1$ and $n_2$ is in the range of from 3 to 20 mole percent.

8. The method of claim 1, wherein said polymer has a molecular weight in the range of from about 75,000 to about 600,000 Daltons.

9. The method of claim 3, wherein the sum of $n_1$ and $n_2$ is in the range of from 3 to 20 mole percent.

10. The method of claim 1, wherein said polymer has a positive charge density of at least 5.0 meq/g at pH 7.0.

11. The method of claim 1, wherein said polymer has a positive charge density of at least 7.0 meq/g at pH 7.0.

12. The method of claim 1, wherein $R_1$ is —CH$_2$CH(OH)CH$_2$—, wherein $R_2$ and $R_3$ are —CH$_3$, the sum of $n_1$ and $n_2$ is in the range of from 3 to 20 mole percent, the polymer has a molecular weight in the range of from about 75,000 to about 600,000 Daltons, and the polymer has a positive charge density of at least 5.0 meq/g at pH 7.0.

13. The method of claim 12 wherein the polymer has a positive charge density of at least 7.0 meq/g at pH 7.0.

14. The method of claim 1, wherein $R_1$ is —CH$_2$CH$_2$—, wherein $R_2$ and $R_3$ are —CH$_3$, the sum of $n_1$ and $n_2$ is in the range of from 3 to 20 mole percent, the polymer has a molecular weight in the range of from about 75,000 to about 600,000 Daltons, and the polymer has a positive charge density of at least 5.0 meq/g at pH 7.0.

15. The polymer of claim 1, wherein the sum of $n_1$ and $n_2$ is between 0.1 mole percent to less than 10 mole percent.

* * * * *